United States Patent
Sawai et al.

(10) Patent No.: US 8,331,518 B2
(45) Date of Patent: Dec. 11, 2012

(54) WIRELESS COMMUNICATION APPARATUS FOR RECEIVING PACKETS TRANSMITTED WITH DELAY AMOUNTS DIFFERENT FOR RESPECTIVE TRANSMISSION BRANCHES

(75) Inventors: Ryou Sawai, Tokyo (JP); Hiroaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 12/555,267

(22) Filed: Sep. 8, 2009

(65) Prior Publication Data

US 2010/0091911 A1   Apr. 15, 2010

(30) Foreign Application Priority Data

Oct. 10, 2008   (JP) .................. 2008-263960

(51) Int. Cl.
*H04L 7/04* (2006.01)
*H04L 27/06* (2006.01)

(52) U.S. Cl. ....................... 375/362; 375/340

(58) Field of Classification Search .......... 375/340, 375/362, 316, 354
See application file for complete search history.

(56) References Cited

U.S. PATENT DOCUMENTS

| | | | |
|---|---|---|---|
| 2003/0012267 A1* | 1/2003 | Jitsukawa et al. | 375/148 |
| 2003/0072255 A1 | 4/2003 | Ma et al. | |
| 2005/0276347 A1 | 12/2005 | Mujtaba et al. | |
| 2007/0189263 A1 | 8/2007 | Izumi et al. | |
| 2009/0011714 A1* | 1/2009 | Hozumi | 455/67.11 |
| 2009/0122882 A1 | 5/2009 | Mujtaba | |

FOREIGN PATENT DOCUMENTS

| | | |
|---|---|---|
| EP | 2043281 A1 * | 4/2009 |
| JP | 2000-354020 | 12/2000 |
| JP | 2005-506757 | 3/2005 |
| JP | 2006-5390 | 1/2006 |
| JP | 2006-42075 | 2/2006 |
| JP | 2006-217248 | 8/2006 |
| JP | 2007-13627 | 1/2007 |
| JP | 2007-221187 | 8/2007 |
| JP | 2007-306342 | 11/2007 |
| JP | 2008-503180 | 1/2008 |
| JP | 2008-530909 | 8/2008 |

OTHER PUBLICATIONS

Office Action issued Aug. 3, 2010 in JP Application No. 2008-263960.

* cited by examiner

*Primary Examiner* — David C. Payne
*Assistant Examiner* — Brian J Stevens
(74) *Attorney, Agent, or Firm* — Oblon, Spivak, McClelland, Maier & Neustadt, L.L.P.

(57) ABSTRACT

A wireless communication apparatus is provided for receiving packets transmitted with delay amounts different for the respective transmission branches. The wireless communication apparatus includes a plurality of reception branches, a synchronous processing unit for detecting synchronous timing independently for the respective reception branches; and a signal processing unit for performing decoding processing and other kinds of processing subsequent to the synchronous timing for the respective reception branches.

9 Claims, 12 Drawing Sheets

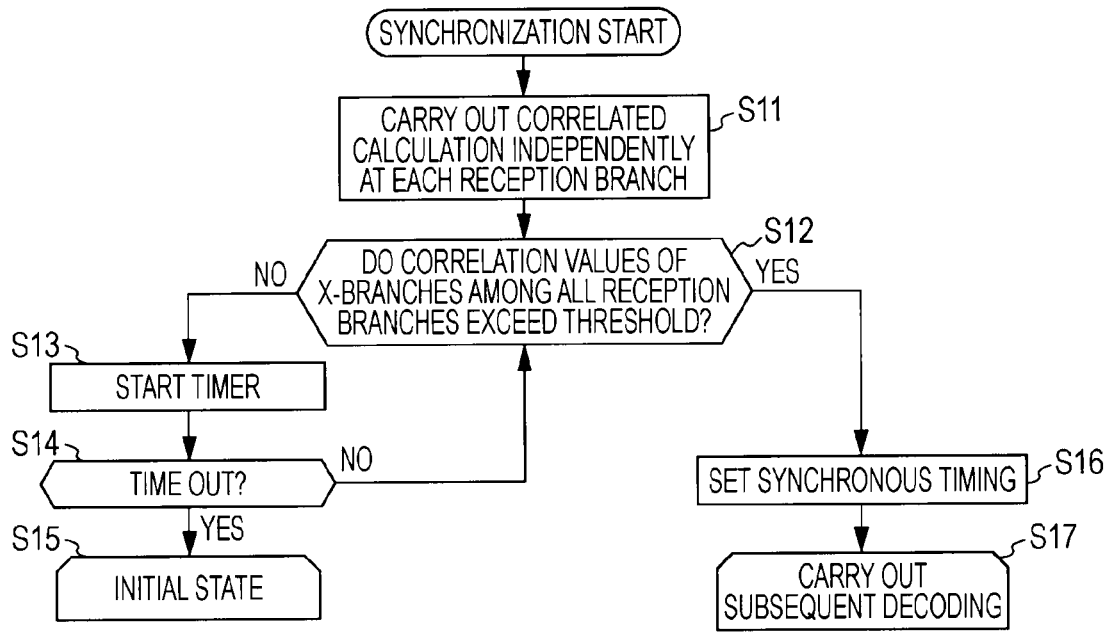
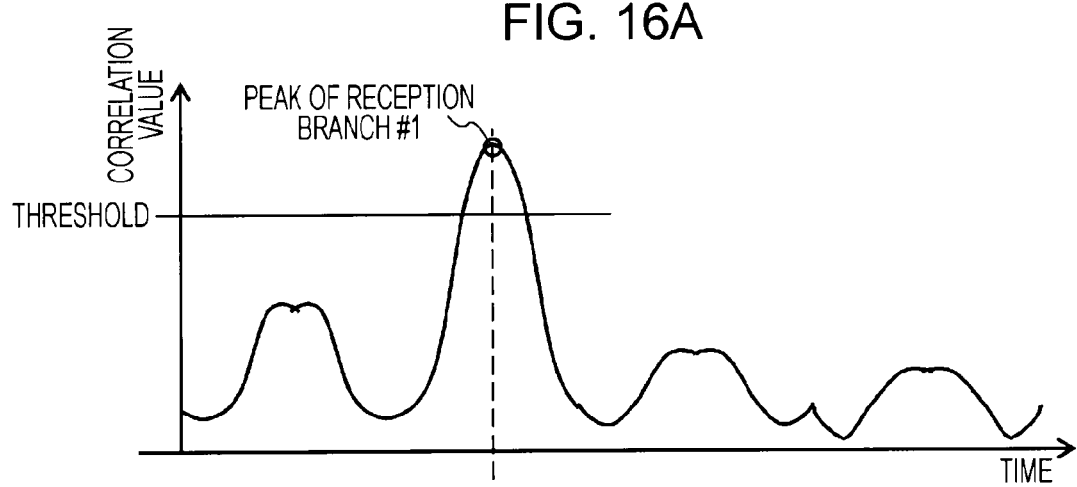
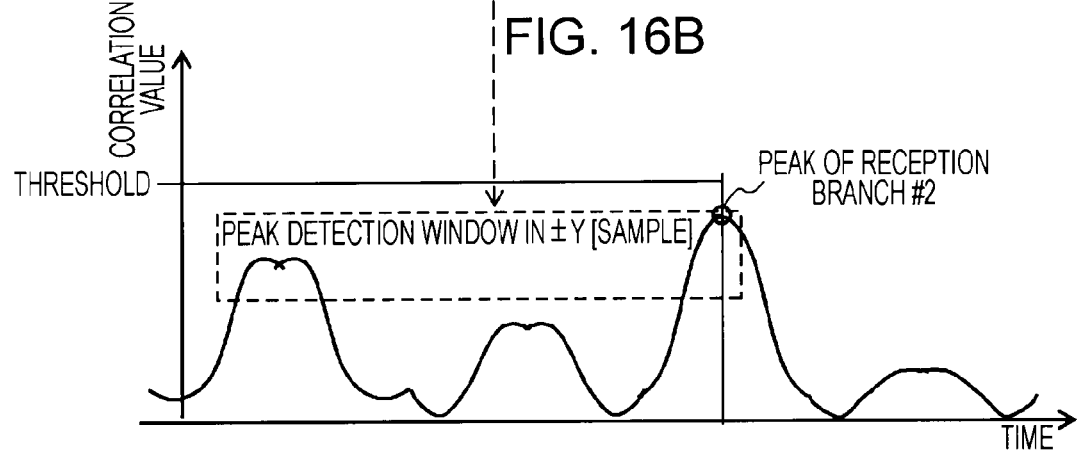

WIRELESS COMMUNICATION APPARATUS FOR RECEIVING PACKETS TRANSMITTED WITH DELAY AMOUNTS DIFFERENT FOR RESPECTIVE TRANSMISSION BRANCHES

BACKGROUND OF THE INVENTION

1. Field of the Invention

The present invention relates to a wireless communication apparatus and method for data communications where the capacity of transmission is extended using a spatial multiplexing communication scheme (multiple input multiple output; MIMO) in combination with a transmitter having a plurality of antennas, and to a computer program applicable to the wireless communication apparatus and method. Specifically, the present invention relates to a wireless communication apparatus and method for data communications which receives packets transmitted after beamforming processing with cyclic delay diversity (CDD), and to a computer program applicable to the wireless communication apparatus and method.

More specifically, the present invention relates to a wireless communication apparatus and method where suitable synchronous timing is obtained based on correlation processing of preamble from packets transmitted with different delay amounts for respective transmission branches, and to a computer program applicable to the wireless communication apparatus and method. Still more preferably, the present invention relates to the present invention relates to a wireless communication apparatus and method where a dynamic range to be indispensable for receiving packets transmitted with different delay amounts for respective transmission branches is diminished, and to a computer program applicable to the wireless communication apparatus and method.

2. Description of the Related Art

Wireless networks have become a focus of attention, as systems free from wiring used for known wired-communication methods. EE (The Institute of Electrical and Electronics Engineers) 802.11 and/or IEEE 802.15 can be named, as an ordinary standard relating to the wireless network. For example, where IEEE 802.11a/g is used, an OFDM (Orthogonal Frequency Division Multiplexing) modulation method which is one of multi-carrier systems is used, as an ordinary standard of wireless LANs.

When IEEE 802.11a/g standards are used, a modulation method achieving a communication speed of 54 Mbps at the maximum is supported. However, a next-generation wireless-LAN standard capable of achieving a higher bit rate has been demanded. The MIMO (Multi-Input Multi-Output) communication draws attention as one of technologies for realizing high-speed wireless communication. For instance, IEEE 802.11n (TGn), an extended standard of IEEE 802.11, employs the OFDM_MIMO communication system.

MIMO is a communication system that realizes spatial multiplexing streams in each of a transmitter and a receiver provided with a plurality of antenna elements.

The transmitter performs space-time coding on a plurality of transmitted data and distributes the multiplexed data to a plurality of transmission antennas, followed by transmitting the data to a channel. On the other hand, the receiver receives signals from the transmission branch by a plurality of receiving antennas through the channel and performs space-time decoding on the received signals to divide them into a plurality of transmission data. Thus, the receiving branch obtains the original data without any cross talk between streams. The MIMO communication system can attain an increase in communication speed by extending the capacity of transmission depending on the number of antennas without extending the range of frequencies. In addition, the MIMO communication system has good frequency utilization efficiency because of using spatial multiplexing. MIMO is a communication mode using a channel characteristic, and it is different from a mere transceiver adaptive array.

In MIMO communications, a transmission weight matrix and a reception weight matrix are calculated using channel-matrix H, respectively. Here, the transmission weight matrix is provided for carrying out spatial multiplexing of transmission streams from a plurality of transmission branches in the transmitter. The reception weight matrix is provided for carrying out spatial separation of the spatial multiplexing signals into a plurality of original streams in the receiver. The channel-matrix H is the numerical matrix using channel information corresponding to a pair of transmission/reception antennas as an element. The term "channel information" used herein is a said here is a transfer function having a phase and amplitude as components. Usually, a channel matrix can be presumed by carrying out a frame exchange sequence including training series constructed of known reference symbols for exciting the channel matrix between the transmitter and the receiver.

In the MIMO communication, an unexpected beam may be formed when identical or similar signals are transmitted through different space streams. For this reason, in IEEE 802.11n, a method of transmitting a time-difference signal from each transmission antenna, so-called cyclic shift or cyclic delay diversity (CDD), is employed.

For example, a wireless communication apparatus for correctly receiving a MIMO_OFDM signal has been disclosed in Japanese Published Patent Application No. 2007-221187. In this method, the usual synchronization acquisition processing is performed using a field for synchronization acquisition in a preamble and a signal is then detected as a MIMO signal to which the addition of a cyclic shift signal is performed between streams, allowing synchronous timing to be adjusted based on the cyclic shift thereof to correctly receive the MIMO_OFDM signal.

In wireless communications, it is noted that a preamble having a repetition of a known training sequence is generally added to the head of a packet. Thus, a receiver performs synchronous processing using such a preamble. Specifically, if the receiver finds a packet by detecting the preamble, the receiver performs subsequent processing, such as the check of precise receiving timing, frequency-offset removing operation, and optionally normalization of received signal electric power (setup of automatic gain control (AGC); AGC gain). Then, the valid symbol section of an OFDM symbol is extracted to feed a received signal to a fast Fourier transform (FFT).

However, a plurality of correlation peaks appears when performing CDD in a MIMO communication system and performing a synchronous processing by a receiver (namely, when applying different delay amounts to the respective packets to be transmitted from two or more transmission antennas). Therefore, if the synchronous timing is obtained by averaging or weighted averaging of the correlation value of the receiving branch, erroneous detection probability may be increased depending on a channel or receiving environment.

It is surmised that the signal level received with two or more antennas by the receiver end has big variation under the influence of multipath fading. Therefore, if each of the reception branches is adapted to the minimum or maximum reception gain, an extremely large dynamic range will be necessary for the subsequent reception operation.

SUMMARY OF THE INVENTION

The present inventors have recognized an outstanding wireless communication apparatus, wireless communication method, and computer program, which are allowed to suitably receive packets subjected to CDD and beamforming-transmitted.

The present inventors have also recognized an outstanding wireless communication apparatus, wireless communication method, and computer program, which are allowed to obtain suitable synchronous timing based on correlation processing of preamble from packets transmitted with different delay amounts for respective transmission branches.

The present inventors have further recognized an outstanding wireless communication apparatus, wireless communication method, and computer program, which are allowed to diminish a dynamic range to be indispensable for receiving packets transmitted with different delay amounts for respective transmission branches.

The present invention has been made in view of the above circumstances.

According to a first embodiment of the present invention, there is provided a wireless communication apparatus for receiving packets transmitted with delay amounts different for the respective transmission branches, including:

a plurality of reception branches; a synchronous processing unit for detecting synchronous timing independently for the respective reception branches; and a signal processing unit for performing decoding processing and other kinds of processing subsequent to the synchronous timing for the respective reception branches.

In the wireless communication system according to the first embodiment of the present invention, the synchronous processing unit may be configured as follows:

When the synchronous processing unit detects the synchronous timing for the respective reception branches by autocorrelation processing of a repetitive portion of time waveform for a preamble period of a received packet, the synchronous processing unit determines that packet synchronization is attained under the conditions that autocorrelation results of more than X reception branches exceed a threshold value. In contrast, the peak value or the maximum value of the autocorrelation values is determined as synchronous timing with respect to a reception branch in which an autocorrelation result does not exceed the threshold (X is an integer of 1 or more but not more than the number of the reception branches).

In the wireless communication system according to the first embodiment of the present invention, the synchronous processing unit may be configured as follows:

When the synchronous processing unit detects the synchronous timing for the respective reception branches by autocorrelation processing of a repetitive portion of time waveform for a preamble period of a received packet, the synchronous processing unit determines that packet synchronization is attained under the conditions that autocorrelation results of more than X reception branches exceed a threshold value. In contrast, with respect to a reception branch in which an autocorrelation result does not exceed the threshold, the peak value or the maximum value of the autocorrelation values is determined as synchronous timing within a peak detection window being defined while focusing the synchronous timing obtained by the reception branches where autocorrelation results exceed the threshold (X is an integer of 1 or more but not more than the number of the reception branches).

In the wireless communication system according to the first embodiment of the present invention, the synchronous processing unit may be configured as follows:

When the synchronous processing unit detects the synchronous timing for the respective reception branches by cross-correlation processing of a repetitive portion of time waveform for a preamble period of a received packet, the synchronous processing unit determines that packet synchronization is attained under the conditions that cross-correlation results of more than X reception branches exceed a threshold value. In contrast, the peak value or the maximum value of the cross-correlation values is determined as synchronous timing with respect to a reception branch in which a cross-correlation result does not exceed the threshold (X is an integer of 1 or more but not more than the number of the reception branches).

In the wireless communication system according to the first embodiment of the present invention, the synchronous processing unit may be configured as follows:

When the synchronous processing unit detects the synchronous timing for the respective reception branches by cross-correlation processing of a repetitive portion of time waveform for a preamble period of a received packet, the synchronous processing unit determines that packet synchronization is attained under the conditions that cross-correlation results of more than X reception branches exceed a threshold value. In contrast, with respect to reception branches in which cross-correlation results do not exceed the threshold, the peak value or the maximum value of the autocorrelation values is determined as synchronous timing within a peak detection window being defined while focusing the synchronous timing obtained by the reception branches where cross-correlation results exceed the threshold (X is an integer of 1 or more but not more than the number of the reception branches).

In the wireless communication system according to the first embodiment of the present invention, the synchronous processing unit may be configured as follows:

When the synchronous processing unit performs packet finding by autocorrelation processing of the repetitive portion of a time waveform of a preamble period in a received packet and cross-correlation processing detects detailed synchronous timing after validating the packet finding, the packet finding is validated under the conditions that the autocorrelation results of X or more reception branches exceed a predetermined threshold (X is an integer of 1 or more but not more than the number of the reception branches).

In the wireless communication apparatus according to the first embodiment of the present invention, the synchronous processing unit may be configured as follows: when the synchronous processing unit performs packet finding by autocorrelation processing of the repetitive portion of a time waveform of a preamble period in a received packet and cross-correlation processing detects detailed synchronous timing after validating the packet finding, the synchronous processing unit determines that packet synchronization is attained under the conditions that cross-correlation results of more than X reception branches exceed a threshold value. In contrast, with respect to reception branches in which cross-correlation results do not exceed the threshold, the peak value or the maximum value of the autocorrelation values is determined as synchronous timing within a peak detection window being defined while focusing the synchronous timing obtained by the reception branches where cross-correlation results exceed the threshold (X is an integer of 1 or more but not more than the number of the reception branches).

In the wireless communication system according to the first embodiment of the present invention further includes a gain controller independently performing gain control of each of the reception branches.

According to a second embodiment of the present invention, there is provided a wireless communication apparatus for receiving packets transmitted with different delay amounts for respective transmission branches, including:

a plurality of reception branches;

a gain controller independently performing gain control of each of the reception branches; and a signal processing unit for performing subsequent decoding processing and other kinds of processing within a limited dynamic range that allows the gain controller to independently perform the gain control of each of the reception branches.

In the wireless communication apparatus according to the second embodiment of the present invention, a setting gain ratio between the reception branches when the gain controller performs gain control is memorized in advance, and a final estimated value is obtained in consideration of a fixed gain ratio between the reception branches when various estimated values for each reception branch are averaged or subjected to weighted averaging depending on likelihood.

According to a third embodiment of the present invention, there is provided a method of wireless communications to receive receiving packets transmitted with different delay amounts for respective transmission branches in a wireless communication apparatus with a plurality of reception branches, including the steps of:

performing synchronous processing where synchronous timing is independently detected for each of the reception branches; and performing signal processing where the synchronous timing independently detected for each of the reception branches is used in decoding processing and other kinds of processing subsequent to the synchronous processing.

According to a fourth embodiment of the present invention, there is provided a method of wireless communications to receive receiving packets transmitted with different delay amounts for respective transmission branches in a wireless communication apparatus with a plurality of reception branches, including the steps of:

performing gain control where each of the reception branches is independently gain-controlled; and performing signal processing where decoding processing and other kinds of processing subsequent are subsequently performed within a limited dynamic range that allows the step of gain control to independently perform the gain control of each of the reception branches.

According to a fifth embodiment of the present invention, there is provided a computer program in computer readable format to execute on a computer processing for receiving packets transmitted with different delay amounts for respective transmission branches in a wireless communication apparatus with a plurality of reception branches, the computer program including:

a program instruction for allowing the computer to be functioned as a synchronous processing unit which detects synchronous timing independently for the every reception branch; and a program instruction for allowing the computer to be functioned as a signal processing where the synchronous timing independently detected for each of the reception branches by synchronous processing unit is used in decoding processing and other kinds of processing subsequent to synchronous processing.

According to a sixth embodiment of the present invention, there is provided computer program in computer readable format to execute on a computer processing for receiving packets transmitted with different delay amounts for respective transmission branches in wireless communication apparatus with a plurality of reception branches, the computer program including:

a program instruction for allowing a computer to be functioned as a gain controller independently performing a gain control of each of the reception branches; and a program instruction for allowing a computer to be functioned as a signal processing unit where decoding processing and other kinds of processing subsequent are subsequently performed within a limited dynamic range that allows the step of gain control to independently perform the gain control of each of the reception branches.

Each of the computer programs according to the fifth and sixth embodiments of the present invention is defined as one described in a computer readable manner so that predetermined processing can be realized on the computer.

In other words, each of the computer programs according to the fifth and sixth embodiments of the present invention is installed in the computer to exert their advantageous collaboration effects on the computer, thereby attaining the same operations and effects as those of each wireless communication apparatus according to any one of the embodiments of the present invention.

According to any of the embodiments of the present invention, the outstanding wireless communication apparatus and the wireless communication method which can receive suitably the packet to which CDD was applied, and by which beamforming transmission was carried out, and a computer program can be offered.

According to the present invention, the outstanding wireless communication apparatus and the wireless communication method which can gain suitable synchronous timing from the transmitted packet to which different delay amount for every transmission branch was applied based on the correlation process of a preamble, and a computer program can be offered.

According to the present invention, the outstanding wireless communication apparatus and the wireless communication method which can reduce the dynamic ranges which are necessary for reception of the transmitted packet to which different delay amount for every transmission branch was applied, and a computer program can be offered.

According to any of the first, third, and fifth embodiments of the present invention, packet synchronization is attained at suitable synchronous timing for each reception branch when receiving the packets transmitted with different delay amounts for the respective transmission branches.

In addition, according to the above modification of the first embodiment, the synchronous processing unit determines that packet synchronization is attained when autocorrelation results of more than X reception branches exceed a threshold value and the peak value or the maximum value of the autocorrelation values is determined as synchronous timing with respect to a reception branch in which an autocorrelation result does not exceed the threshold.

In addition, according to the above modification of the first embodiment, the synchronous processing unit determines that packet synchronization is attained when autocorrelation results of more than X reception branches exceed a threshold value. With respect to reception branches in which autocorrelation results do not exceed the threshold, the peak value or the maximum value of the autocorrelation values is determined as synchronous timing within a peak detection window being defined while focusing the synchronous timing obtained by the reception branches where autocorrelation results exceed the threshold.

In addition, according to the above modification of the first embodiment, the synchronous processing unit determines that packet synchronization is attained when cross-correlation results of more than X reception branches exceed a threshold value and the peak value or the maximum value of the cross-correlation values is determined as synchronous timing with respect to a reception branch in which a cross-correlation result does not exceed the threshold.

In addition, according to the above modification of the first embodiment, the synchronous processing unit determines that packet synchronization is attained when cross-correlation results of more than X reception branches exceed a threshold value. With respect to reception branches in which cross-correlation results do not exceed the threshold, the peak value or the maximum value of the autocorrelation values is determined as synchronous timing within a peak detection window being defined while focusing the synchronous timing obtained by the reception branches where cross-correlation results exceed the threshold.

In addition, according to the above modification of the first embodiment, the synchronous processing unit performs packet finding by autocorrelation processing of the repetitive portion of a time waveform of a preamble period in a received packet. In addition, cross-correlation processing detects detailed synchronous timing after validating the packet finding. At this time, the packet finding is validated when the autocorrelation results of X or more reception branches exceed a predetermined threshold.

In addition, according to the above modification of the first embodiment, the synchronous processing unit performs packet finding by autocorrelation processing of the repetitive portion of a time waveform of a preamble period in a received packet. In addition, cross-correlation processing detects detailed synchronous timing after validating the packet finding. At this time, the synchronous processing unit determines that packet synchronization is attained when cross-correlation results of more than X reception branches exceed a threshold value. In addition, with respect to reception branches in which cross-correlation results do not exceed the threshold, the peak value or the maximum value of the autocorrelation values is determined as synchronous timing within a peak detection window being defined while focusing the synchronous timing obtained by the reception branches where cross-correlation results exceed the threshold.

Furthermore, according to any of another modification of the first embodiment, the second, fourth, and sixth embodiment, AGC is performed every reception branch when receiving packets transmitted with different delay amounts for respective transmission branches, a dynamic range which is indispensable for subsequent reception operations such as digital conversion of received signals can be diminished.

According to the above modification of the second embodiment, a setting gain ratio between the reception branches when the gain controller performs gain control is memorized in advance, and a final estimated value is obtained in consideration of a fixed gain ratio between the reception branches when various estimated values for each reception branch are averaged or subjected to weighted averaging depending on likelihood.

The detailed description of the present invention will make clear further purposes, features, and advantages of the present invention with reference to the embodiments of the present invention which will be described later and the attached drawings.

BRIEF DESCRIPTION OF THE DRAWINGS

FIG. 8 is a schematic diagram illustrating the data structure of a HT-SIG field, where

FIG. 10 is a waveform diagram illustrating exemplary output correlation peaks obtained by receiving the above CDD signals passed through multipath channels by four receiving branches, where

FIG. 15 is a flowchart illustrating another example of processing procedures for detecting synchronous timing based on the results of correlation processing for the respective reception branches;

FIG. 16 is a waveform diagram illustrating how to determine synchronous timing of the reception branch which has not exceeded the threshold at the time of defining synchronous timing according to the processing procedures shown in FIG. 15, where FIG. 16A shows the peak of a reception branch #1, which exceeds the threshold, and FIG. 16B shows the peak of a reception branch #2, which does not exceed the threshold;

DESCRIPTION OF THE PREFERRED EMBODIMENTS

Figure 1:
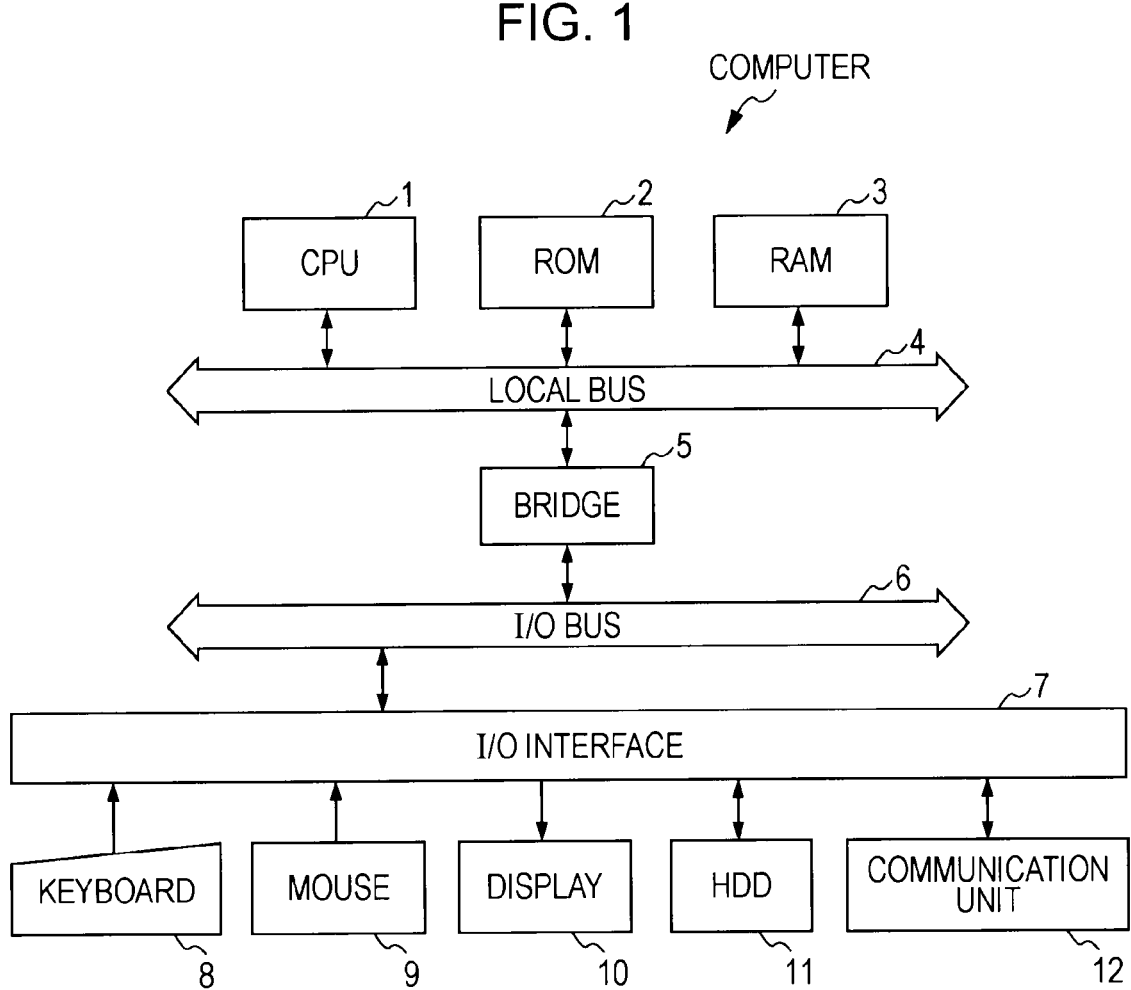
FIG. 1 is a schematic block diagram illustrating an exemplary configuration of a computer with a wireless communication function.

Hereinafter, an embodiment of the present invention will be described with reference to the attached drawings. FIG. 1 is an exemplary configuration of a computer with a wireless communication function.

A central processing unit (CPU) 1 executes programs stored in a read only memory (ROM) 2 and a hard disk drive (HDD) 11 in the program execution environment provided by operating system (OS). For example, the CPU 1 may execute a predetermined program to perform synchronous processing of a received packet or processing of part thereof which will be described later. The ROM 2 stores program codes such as those of the power on self test (POST) and the basic input/output system (BIOS). In addition, a random access memory (RAM) 3 is used for loading the program stored in the ROM 2 or the HDD 11 onto the CPU 1 to execute the program or temporarily holding the work data of the program under execution temporarily. These structural components are connected to one another through a local bus 4 directly linked with a local pin. The local bus 4 is connected to an input-output (I/O) bus, such as a peripheral component interconnect (PCI), through a bridge 5.

Input devices operated by user are a key board 8 and a pointing device (such as a mouse) 8. A display 10 may be a liquid crystal display (LCD) or a cathode ray tube (CRT) to display various kinds on information in text and image.

The HDD 11 includes a drive unit with a built-in hard disk as a removing medium and drives such a hard disk. The hard disk is used for installation of CPU-executable programs such as the operation system and various kinds of applications and storage of data files or the like.

A communication unit 12 is a wireless communications interface that conforms IEEE 802.11a/n or the like, acting as an access point or a terminal station in infrastructure mode or acting in ad hoc mode to execute communication with another communication terminal in a range of communications.

In this embodiment, in each of a transmitter and a receiver on the communication unit 12 has a plurality of antenna elements and adopts the MIMO communication scheme to realize spatial multiplexing streams. The transmission branch performs space-time coding on a plurality of transmitted data and distributes the multiplexed data to a plurality of transmission antennas, followed by transmitting the data to a channel. On the other hand, the reception branch receives signals from the transmission branch by a plurality of receiving antennas through the channel and performs space-time decoding on the received signals to divide them into a plurality of transmission data. Thus, the reception branch obtains the original data without any cross talk between streams. The MIMO communication scheme can attain an increase in communication speed by extending the capacity of transmission depending on the number of antennas without extending the range of frequencies.

Figure 2:
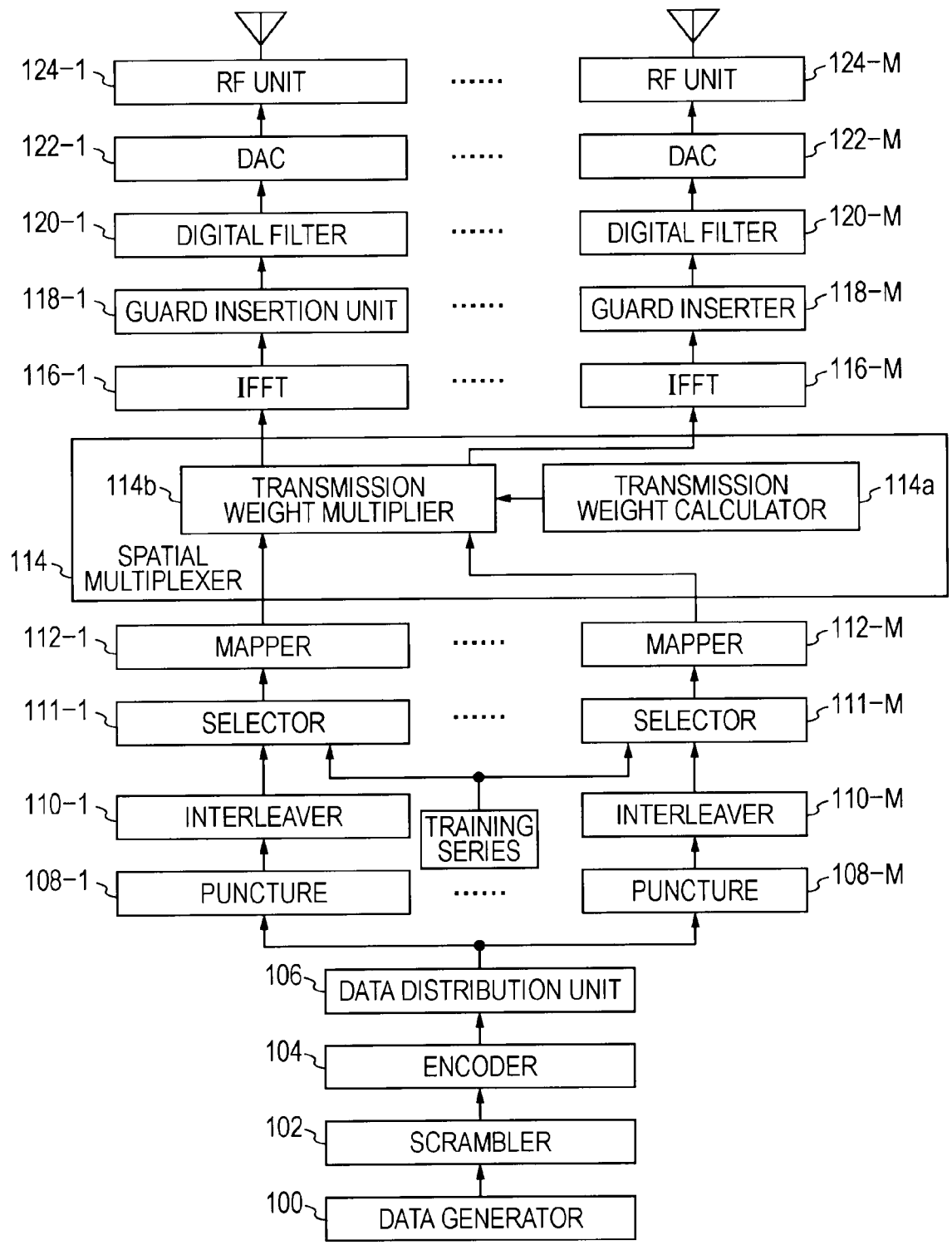
FIG. 2 is a schematic block diagram illustrating an exemplary configuration of a transmitter on a communication unit 12, where the transmitter performs MIMO communications.
Figure 3:
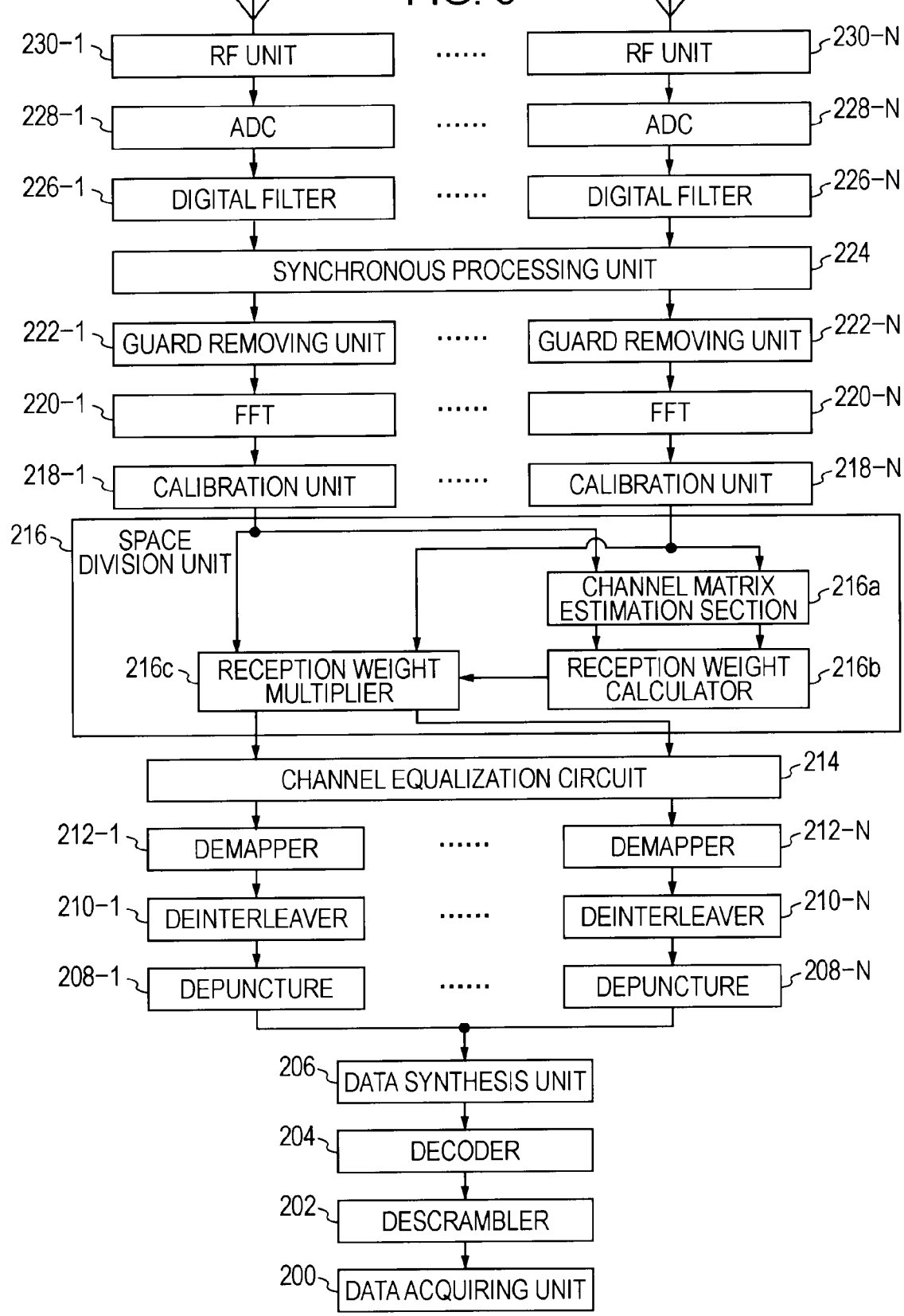
FIG. 3 is a schematic block diagram illustrating an exemplary configuration of a receiver on the communication unit 12, where the receiver performs MIMO communications.

FIG. 2 illustrates an exemplary configuration of the transmitter on the communication unit 12 and FIG. 3 illustrates an exemplary configuration of the receiver on the communication unit 12. Both the transmitter and the receiver perform MIMO communication.

The number of antennas of the transmitter shown in FIG. 2 (or the number of transmission branches) is "M" ("M" is an integer number not less than one (1)). For example, "M" is four (4) at a maximum based on the IEEE specification. Hereinafter, an exemplary configuration of the transmitter in the case of performing transmit beamforming will be described.

Transmit data supplied from a data generator 100 is scrambled by a scrambler 102 and then subjected to error correction coding by an encoder 104. The scrambling system and the coding system may follow the definitions in the IEEE 802.11a standard. The encoded signals are then input in a data distribution unit 106 and then distributed to each of transmission streams.

In each transmission stream, a transmission signal is punctured by a puncture 108 according to a data rate applied to each stream and then interleaved by an interleaver 110. Subsequently, the signal is mapped to an IQ signal space having an in phase (I) and a quadrature phase (Q) by a mapper 112 to obtain a complex baseband signal. A selector 111 inserts training series into the transmission signal of each interleaved spatial stream at appropriate timing and then supplies it to a mapper 112. In an interleaving scheme expands the definition of IEEE 802.11a, such that the same interleaving is not performed among a plurality of streams. For mapping scheme, BPSK, QPSK, 16 QAM, or 64 QAM is applied according to IEEE 802.11a.

In a spatial multiplexer 114, for example, a transmission weight calculator 114a constructs a transmit beamforming matrix V from a channel matrix H by a matrix decomposition method such as a singular value decomposition (SVD). Alternatively, a transmit beamforming matrix V may be constructed from channel information feed-backed from a communications partner as is well known in the art. A transmission weight matrix multiplication unit 114b multiplies a transmission vector using transmission streams as its elements by this transmission weight matrix V to subject the transmission signal to beamforming.

Furthermore, instead of performing the accommodative transmit beamforming based on the channel matrix H, the transmission weight matrix multiplication unit 114b may perform fixed beamforming such as cyclic delay diversity (CDD) where transmission timing between the transmitting branches is provided with a time lag. As one of the advantageous features of the CDD, it does not form unexpected beam when identical or similar signals are transmitted through different space streams.

An inverse fast Fourier transform unit (IFFT) 116 converts each of sub-carriers arranged in a frequency region into a time axis signal. Furthermore, a guard insertion unit 118 adds a guard interval to the time axis signal. Subsequently, a digital filter 120 performs band limitation and then a digital-analog converter (DAC) 122 converts the band-limited signal into an analog signal. A RF unit 124 removes signal components out of a desired bandwidth from the analog signal by the analog LPF, up-converts the center frequency of the signal to a desired RF frequency band, and amplifies the amplitude of the signal by power amplifier. The transmission signal at the RF band is then emitted from each transmission antenna to a space.

Furthermore, the number of antennas of the transmitter shown in FIG. 3 (or the number of transmission branches) is "M" ("M" is an integer number not less than one (1)). For example, "M" is four (4) at a maximum based on the IEEE specification. The receiver, which will be described below, is designed to receive packets transmitted after beamforming processing with different amounts of delay for the respective transmission branches.

First, data that reaches the receiver through the channel is analog-processed in an RF unit 230 in each of the reception branch.

Figure 4:
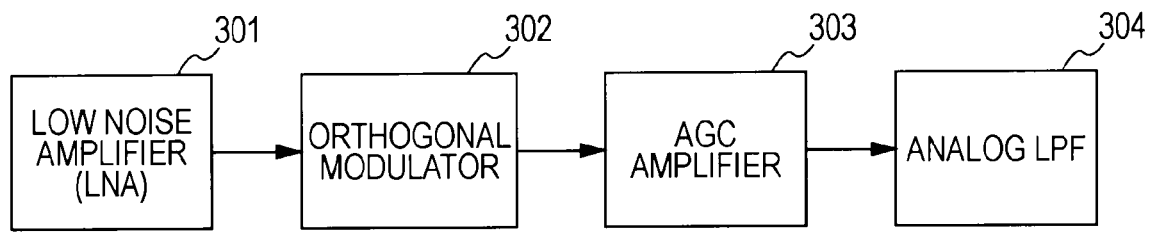
FIG. 4 is a schematic block diagram illustrating an exemplary configuration of a RF unit 230 for each receiving brunch.

FIG. 4 illustrates an exemplary configuration of the RF unit 230 for each reception branch. The RF unit 230 shown in the figure is designed so that the electric power of a received signal will be within the dynamic range of an AD converter (described later). In other words, the RF unit 230 includes a low noise amplifier (LNA) 301, an orthogonal demodulator (IQ demodulator) 302 for down conversion of a received signal in the RF frequency band, an AGC amplifier 303 for normalizing the signal, and an analog low-pass filter (LPF) 304 for removing signal components out of a desired bandwidth from the signal.

An AD converter (ADC) 228 converts the analog received signal into a digital signal and then passes the digital signal to a digital filter 226. Subsequently, synchronous timing is detected in a synchronous processing unit 224 where several kinds of processing, such as frequency-offset amendment and noise level (or SNR) presumption, are also performed. The detection of synchronous timing is performed by taking autocorrelation or cross-correlation of a known training sequence burstly included at the head of a received packet (described later).

In a guard removing unit 222, a guard interval added to the head of a data transmission interval is removed therefrom. Then, a fast Fourier transform unit (FFT) 220 converts a time axis signal into a frequency axis signal. The following calibration unit 218 multiplies the received signals of the respective reception branches by calibration coefficient for correcting imbalances in phase and amplitude between the reception branches, where the imbalance correction is performed in a digital section (not shown).

A space division unit 216 performs space division processing of a spatially multiplexed reception signal. Specifically, a channel matrix estimation section 216a constructs an estimation channel matrix H from a training series for exciting a channel matrix received by each reception branch. The estimation channel matrix H may be passed as a backward channel matrix to the transmission weight calculator section 114a of the transmitter. In addition, a multiplication section for antenna reception weight matrix (hereinafter, referred to as a reception weight calculator) 216b calculates an antenna reception weight matrix W based on the channel matrix H obtained by a channel matrix estimation section 216a. An antenna reception weight matrix 216b multiplies a reception vector having each reception stream as its element by the antenna reception weight matrix W to perform spatial decoding of the spatial multiplexed signal, thereby obtaining independent signal series for each stream.

A channel equalization circuit 214 performs remaining frequency offset correction and channel tracking with respect to the signal series of each stream. A demapper 212 damps the reception signal on the IQ signal space, a deinterleaver 210 performs deinterleaving, and a depuncure 208 performs depuncturing at a predetermined data rate.

A data synthesis unit 206 combines a plurality of reception streams to make a single stream. Operation completely contrary to the data division which performs this merge process by a transmitting side is performed. And in a decoder 204, after carrying out an error correction decoding based on likelihood information, it descrambles by a descrambler 202 and data acquiring unit 200 acquires reception data.

Next, packet formats used in communications systems will be described. A PHY layer of IEEE 802.11n is provided with a high-throughput (HT) transfer mode (hereinafter referred to as "HT mode"). In this mode, a transfer method (Modulation and Coding Scheme: MCS) including a modulation method and/or an encoding method is entirely different from that of IEEE 802.11a/g. In addition, the PHY layer is provided with an operation mode wherein data transmission is performed in the same packet format and frequency area as those of IEEE 802.11a/g (hereinafter referred to as "legacy mode"). Further, the HT mode is divided into two different operation modes. One is compatible with a known terminal supporting IEEE 802.11a/g (hereinafter referred to as a "legacy terminal") and referred to as a "mixed mode (MM)", and the other is not compatible with the legacy terminal at all and referred to as a "green field (GF)".

Figure 5:
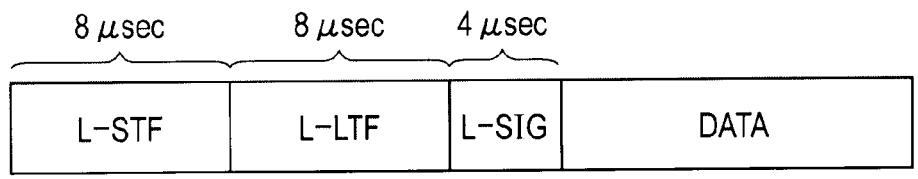
FIG. 5 is a schematic block diagram illustrating a packet format in a legacy mode specified by IEEE 802.11n.
Figure 6:
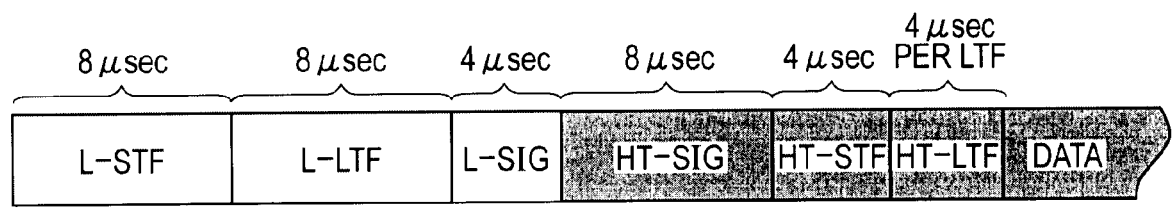
FIG. 6 is a schematic block diagram illustrating a packet format in MM mode specified by IEEE 802.11n.

The packet formats in legacy mode and MM mode are shown in FIG. 5 and FIG. 6, respectively. However, in each figure, a single OFDM symbol presupposes that it is 4 microseconds. The format of a packet used in the legacy mode shown in FIG. 5 (hereinafter referred to as a "legacy packet") is entirely the same as that of IEEE 802.11a/g. The header portion of the legacy packet has a legacy preamble. That is, the legacy preamble includes: a legacy short training field (L-STF) including a known OFDM symbol provided for finding a packet; a legacy long training field (L-LTF) including a known training symbol provided for performing synchronization acquisition and equalization; and a legacy signal field (L-SIG) on which the transfer rate and/or the data length is written. Subsequently, a payload (Data) is transmitted.

Furthermore, the header portion of a packet shown in FIG. 6 (hereinafter referred to as an "MM packet") includes: a legacy preamble generated in a format which is entirely the same as that used for IEEE 802.11a/g; a subsequent preamble generated in a format which is typically used for IEEE 802.11n (hereinafter referred to as an "HT format") (hereinafter referred to as an "HT preamble"); and a data portion. In the MM packet, the portion corresponding to a PHY payload in the legacy packet is formed in HT format. Recursively, the HT preamble and the PHY payload may be provided in HT format.

The HT preamble includes an HT-SIG, an HT-STF, and an HT-LTF. The HT-SIG describes information necessary to understand the HT format, such as information about an MCS and/or the payload-data length used for the PHY payload (PSDU). In addition, the HT-STF includes a training symbol provided for improvement of automatic-gain control (AGC) in a MIMO system. Furthermore, the HT-LTF includes a training symbol provided for performing channel estimation for every input signal subjected to spatial modulation (mapping) in the receiver.

Furthermore, when the MIMO communication is performed using at least two transfer branches, the receiver has to acquire a channel matrix by performing channel estimation for every transmission/reception antenna performing spatial separation for a reception signal. Therefore, the transmitter is designed to transmit the HT-LTF from each of transmission antennas to the receiver in a time-division manner. Subsequently, at least one HT-LTF field is added according to the spatial-stream number.

The legacy preamble provided in the MM packet is generated in a format which is entirely the same as that of the preamble of the legacy packet and transferred in a transfer scheme so that the legacy terminal can decode the legacy preamble. On the other hand, the HT-format portion that comes after the HT preamble is transferred in a transfer method that is not supported by the legacy terminal. The legacy terminal decodes the L-SIG included in the legacy preamble of the MM packet. Then, the legacy terminal reads information showing that the MM packet is not addressed to itself, data-length information, and so on. The legacy terminal sets a network allocation vector (NAV) of an appropriate length, a transmission-wait-time interval, to avoid a collision. As a result, the MM packet can achieve compatibility with the legacy terminal.

Figure 7:
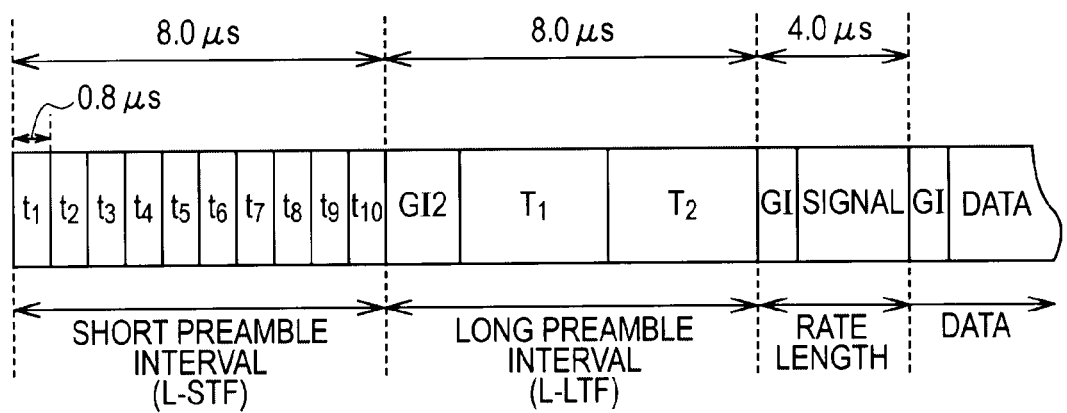
FIG. 7 is a schematic block diagram illustrating the configuration of a legacy preamble.

FIG. 7 illustrates the configuration of a legacy preamble. To the head portion of the legacy preamble, a short preamble interval of 8.0 microseconds (STF: short training field) and a long preamble interval of 8.0 microseconds (LTF: long training field). The short preamble interval is formed of a short training sequence (STS), in which ten short preamble symbols t1 to t10 are transmitted in a burst manner, or repeatedly transmitted 10 times. The long preamble interval is formed of a long training sequence (LTS), in which two long preamble symbols T1 to T2 are repeatedly transmitted twice after a guard interval GI2 of 1.6 microseconds.

In general, the receiver can determine synchronous timing (coarse) by taking autocorrelation between known short training sequences STSs repeatedly occurred in STF and finding that the absolute value (the square thereof) of the autocorrelation exceeds a predetermined threshold.

In general, a receiver sets the ACG gain of the receiver and corrects a DC offset using four STS symbols of 0.8 μs, and performs frequency-offset estimation and correction, packet detection, and coarse timing detection using the remaining six STS symbols. For example, packet detection is used as a trigger, and the remaining preamble intervals are used for performing timing detection, frequency-offset measurement, digital gain control, and so on (see, for example, Japanese Published Patent Application No. 2004-221940 (paragraph Nos. 0158 to 0164 and FIG. 29). In addition, cross-correlation with a known signal in the L-LTF interval subsequent to the L-STF is determined and synchronous timing (detailed) is then detected on the basis of the resulting peak.

Figure 8A:
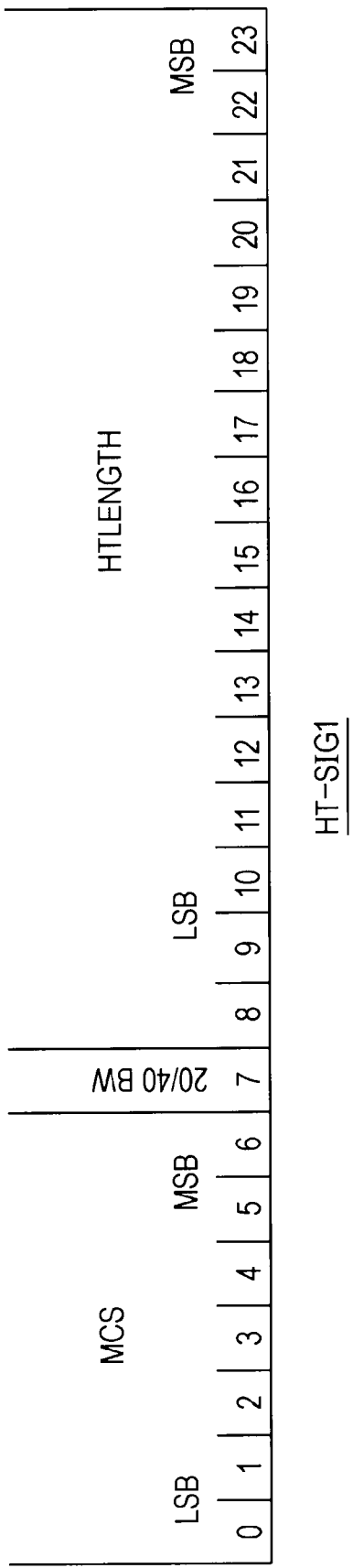
FIG. 8A shows HT-SIG 1 and FIG. 8B shows HT-SIG 2.
Figure 8B:
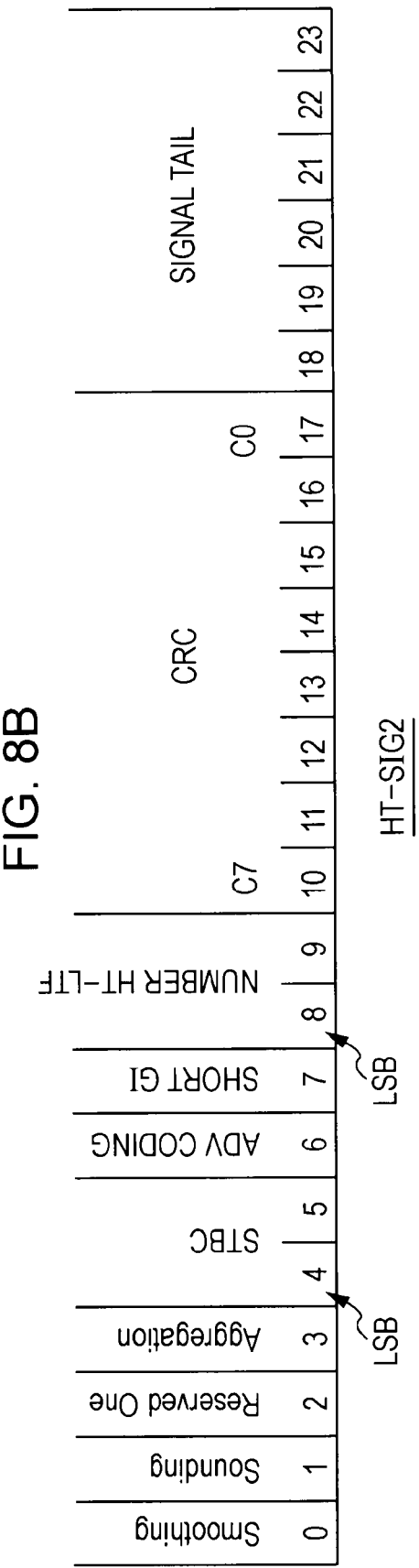

FIG. 8 illustrates the data structure of the HT-SIG filed. As shown in the figure, the HT-SIG field is constructed of two OFDM symbols, HT-SIG 1 (FIG. 8A) and HT-SIG 2 (FIG. 8B), describing information necessary for interpreting the HT format including MCS (described later) used for the PHY payload (PSDU), the data length of the payload, and so on. Irrespective of whether the MM packet or the GF packet is used, the details of the information written in the HT-SIG field are one and the same.

Furthermore, irrespective of whether the MM packet or the GF packet is used, the preamble portion including the HT-SIG field is arranged so that the BPSK modulation with an encoding rate of ½ is used for both the legacy preamble and an HT preamble. The use of low data rate as described above ensures processing and/or information notification necessary for performing the packet reception.

In the MIMO communication, an unexpected beam may be formed when identical or similar signals are transmitted through different space streams. For this reason, as described above, a method of transmitting a time-difference signal from each transmission antenna, CDD, is employed.

According to IEEE 802.11n, the number of spatial streams $N_{ss}$ can be specified as described below in addition to obtain information about a transfer method to be applied to the HT field on the basis of the value of a modulation and coding scheme (MCS) in the first symbol of control information in the head portion of the HT packet (HT-SIG 1).

If the spatial streams use the same modulation scheme, the MCS value and the spatial stream number $N_{ss}$ are as follows:

MCS 0 to 7=>N=1

MCS 8 to 15=>N=2

MCS 16 to 23=>$N_{ss}$=3

MCS 24 to 31=>$N_{ss}$=4

If spatial streams use their respective modulation schemes different from one another, the MCS value and the spatial stream number $N_{ss}$ are as follows:

MCS 33 to 38=>$N_{ss}$=2

MCS 39 to 52=>$N_{ss}$=3

MCS 53 to 76=>$N_{ss}$=4

Furthermore, according to Table 1 and Table 2 below, the delay amount (cyclic shift value) of transmission timing between transmission antennas can be identified from the number of spatial streams $N_{ss}$ with respect to each of the legacy preamble part and the HT format part of the MM packet.

TABLE 1

Delay amount of transmission timing of legacy part

| Number of transmission branches | Delay amount of transmission branch #1 | Delay amount of transmission branch #2 | Delay amount of transmission branch #3 | Delay amount of transmission branch #4 |
|---|---|---|---|---|
| 1 | 0 ns | — | — | — |
| 2 | 0 ns | −200 ns | — | — |
| 3 | 0 ns | −100 ns | −200 ns | — |
| 4 | 0 ns | −500 ns | −100 ns | −150 ns |

TABLE 2

Delay amount of transmission timing of HT part

| Number of spatial streams | Delay amount of stream #1 | Delay amount of stream #2 | Delay amount of stream #3 | Delay amount of stream #4 |
|---|---|---|---|---|
| 1 | 0 ns | — | — | — |
| 2 | 0 ns | −400 ns | — | — |
| 3 | 0 ns | −400 ns | −200 ns | — |
| 4 | 0 ns | −400 ns | −200 ns | −600 ns |

For example, when the MIMO communications are performed using two spatial streams, the second spatial stream in the legacy preamble part includes a time-difference signal with a delay amount of −200 nanoseconds (ns) with respect to the first spatial stream.

However, a plurality of correlation peaks will appear when a signal with CDD (i.e., a signal with a different delay amount for each transmission antenna) is subjected to synchronous processing in the receiver. Therefore, if the synchronous timing is obtained by averaging or weighted averaging of the correlation value of the reception branch, erroneous detection probability may be increased depending on a channel or receiving environment.

In addition, signal levels received by the receiver through a plurality of antennas may have significant variations due to multipath fading. Therefore, if each of the reception branches is adapted to the minimum or maximum reception gain, an extremely large dynamic range will be necessary for the subsequent reception operation.

Figure 9:
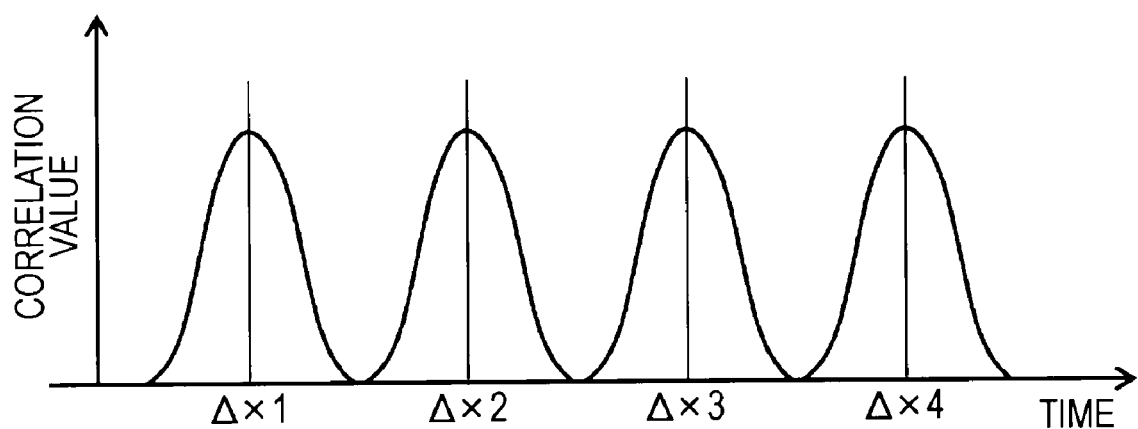
FIG. 9 is a waveform diagram illustrating an example of the correlation peaks of CDD signals with different delay amounts ($\Delta \times 1$, $\Delta \times 2$, $\Delta \times 3$, and $\Delta \times 4$) from four transmission branches.
Figure 10A:
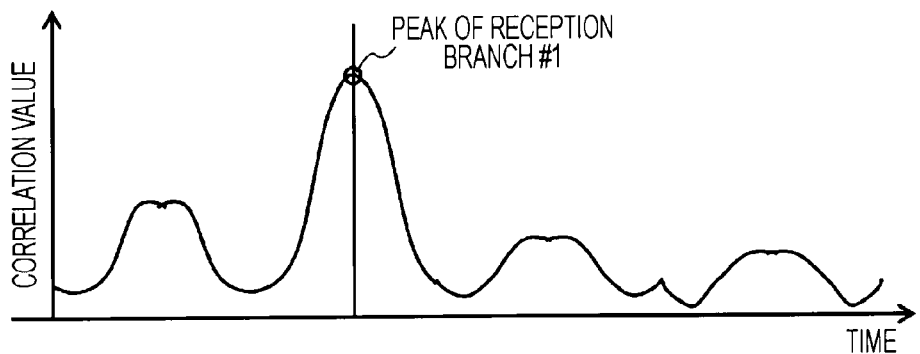
FIGS. 10A to 10D show different peaks of the respective reception branches #1 to #4.
Figure 10B:
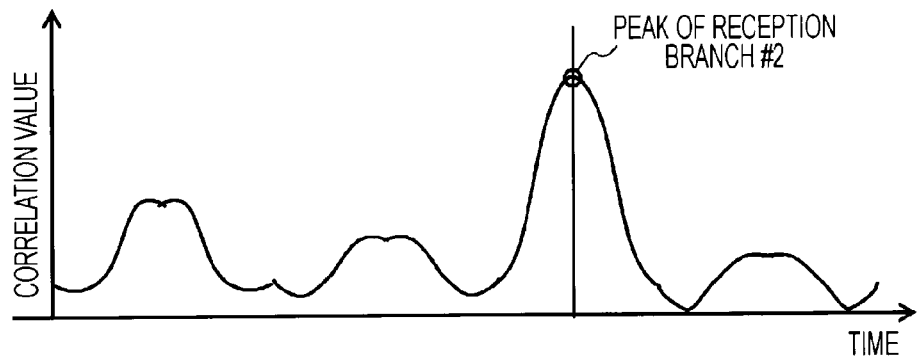
Figure 10C:
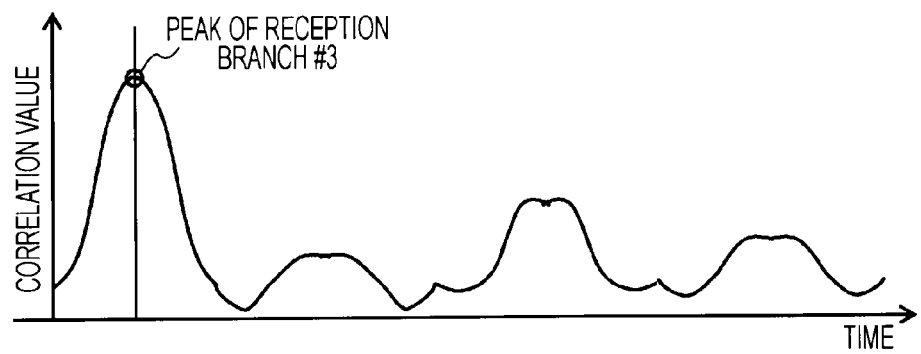
Figure 10D:
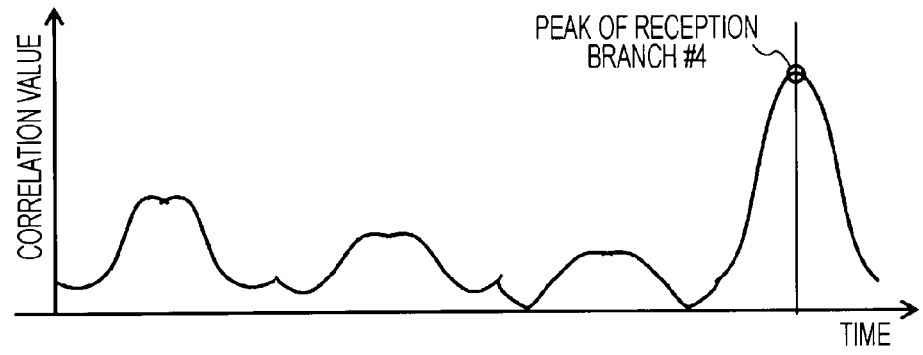

FIG. 9 illustrates an example of the correlation peaks of CDD signals with different delay amounts (Δ×1, Δ×2, Δ×3, and Δ×4) from four transmission branches, which are represented in the undermost row of Table 1 as described above.

In addition, FIG. 10 illustrates exemplary output correlation peaks obtained by receiving the above CDD signals passed through multipath channels by four reception branches. Specifically, FIG. 10A to FIG. 10D illustrate different output correlation peaks obtained in the respective reception branches #1 to #4. As shown in the figures, the correlation values for signals passed through the actual MIMO transmission path have different correlation peaks for the respective reception branches. If the phases of the correlation peaks for the respective reception branches are significantly different from one another, averaging or weighted averaging of the correlation values of the reception branches is inefficient.

On the other hand, the present inventors consider that an improvement in detection accuracy will be obtained by independently detecting synchronous timing if there is a large difference in phase of correlation peak among the reception branches. Even if processing is performed with different synchronous timing for each reception branch, there is no substantial effect on the subsequent receiving processing just as in the case with the use of common synchronous timing in the respective reception branches.

Figure 11:
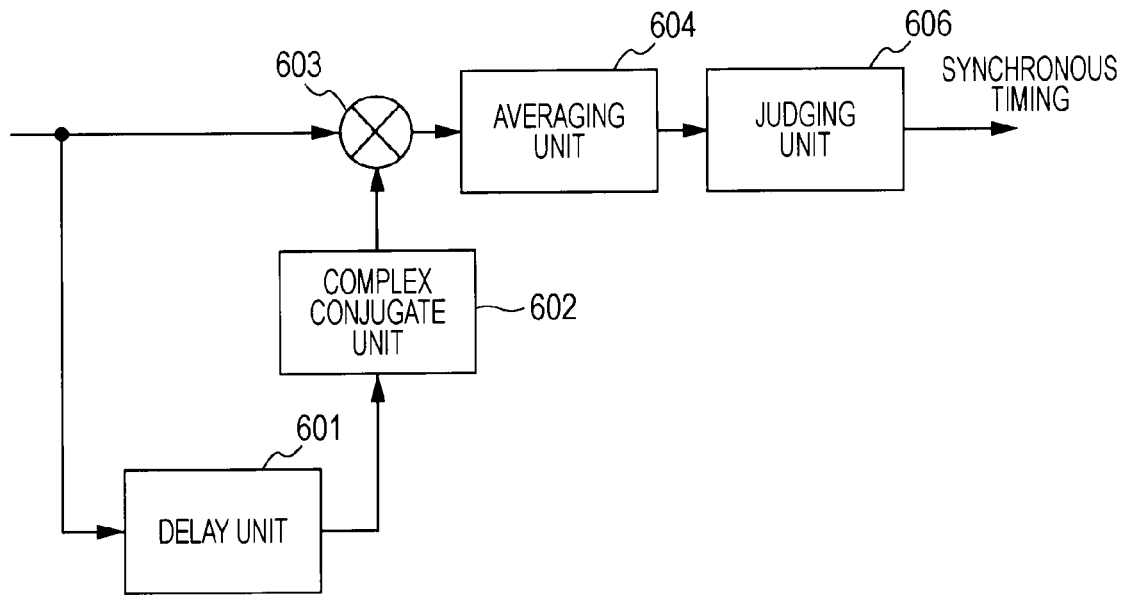
FIG. 11 is a schematic block diagram illustrating an exemplary configuration of a circuit for synchronizing detection by autocorrelation processing.

FIG. 11 illustrates an exemplary configuration of a circuit for synchronizing detection by correlation processing, which is arranged in each reception branch. The example shown in the figure is designed to perform autocorrelation processing is performed using an L-STF interval, but not limited thereto.

A delay unit 601 holds a received signal with repetitive periodic intervals of a known training sequence burstly added to the head of a packet and outputs such a signal as a delay signal. A complex conjugate unit 602 takes the complex conjugate of this delay signal. A multiplier unit 603 performs complex conjugate multiplication between the received signal and the delay signal per repetitive periodic interval (0.8 microseconds) of the known training sequence.

An averaging unit 604 calculates the moving average of products output from the multiplier unit 603 for a predetermined moving average section to find an autocorrelation value. Subsequently, a judging unit 606 finds out a packet at a time when the autocorrelation value exceeds the predetermined threshold. As a result, synchronous timing is obtained.

Here, if the autocorrelation results of a predetermined number X of the received branches exceed a threshold value when the synchronous processing unit 224 performs correlation processing using a known training sequence of a time waveform at a preamble interval, it is determined that packet synchronization is attained ("X" is an integer of one or more). In the case of a reception branch that does not exceed the threshold, an autocorrelation value which is the peak value or the maximum value may be determined as synchronous timing.

Alternatively, the synchronous processing unit 224 determines that the packet synchronization is attained when the autocorrelation results of a predetermined number X of the received branches exceed a threshold value. However, in the case of a receiving branch which does not exceed the threshold, a peak detection window within ±y[samples] from the synchronous timing of the branch that exceeds the threshold is formed and an autocorrelation value which is the peak value or the maximum value may be determined as synchronous timing.

Figure 12:
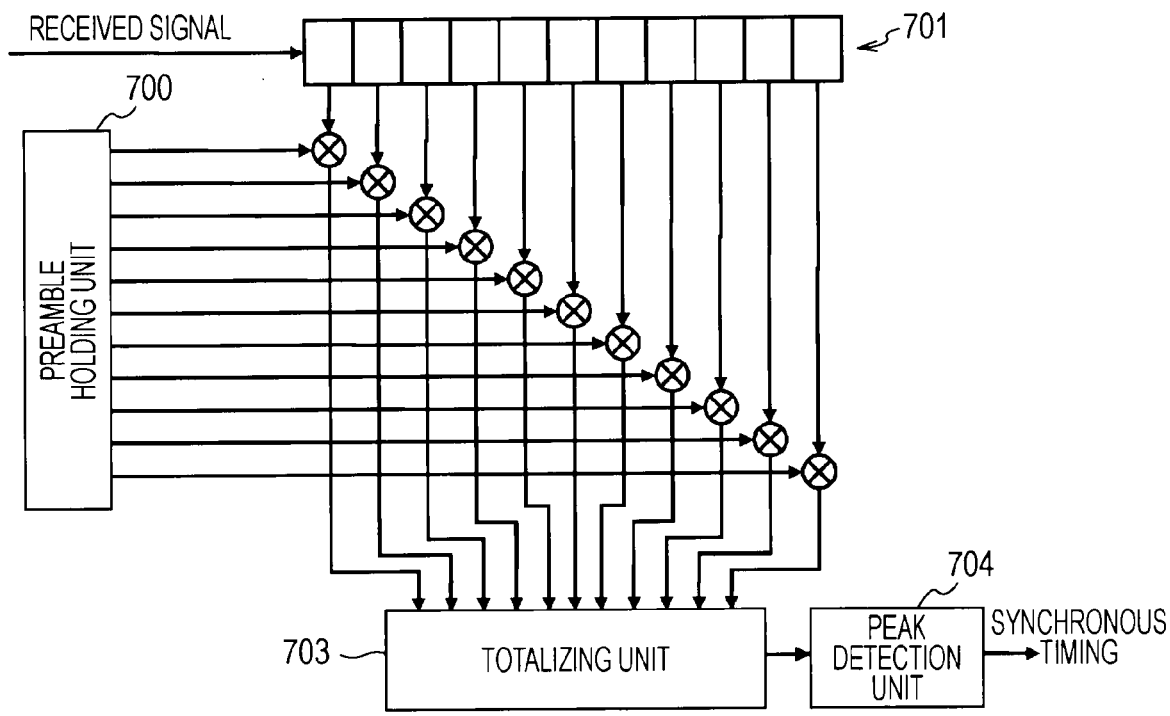
FIG. 12 is schematic block diagram illustrating an exemplary configuration of a circuit for synchronizing detection by cross-correlation processing.

Furthermore, FIG. 12 illustrates an exemplary configuration of a circuit for synchronizing detection by correlation processing, which is arranged in each reception branch. The example shown in the figure is designed to perform cross-correlation processing is performed using an L-LTF interval, but not limited thereto.

A delay unit 701 is constructed of a plurality of delay elements respectively having delay times equivalent to sample cycles and connecting to one another in series, thereby providing the delay time of a timing estimation period as a whole. On the other hand, a preamble holding unit 700 holds patterns of a known training sequence LTS defined by standard. Thus, received signal samples are delayed every sample in each delay element of the delay unit 701 and each of the delayed signal is then multiplied by the pattern held in the preamble holding unit 700. A totalizing unit 503 sums up the results of the multiplication to find an inner product, thereby obtaining a cross-correlation value. Furthermore, a peak detection unit 704 outputs the peak position of the cross-correlation function as synchronous timing in the reception branch.

Here, if the cross-correlation results of a predetermined number X of the received branches exceed a threshold value when the synchronous processing unit 224 performs correlation processing using a known training sequence of a time waveform at a preamble interval, it is determined that packet synchronization is attained ("X" is an integer of one or more). In the case of a reception branch that does not exceed the threshold, a cross-correlation value which is the peak value or the maximum value may be determined as synchronous timing.

Alternatively, the synchronous processing unit 224 determines that the packet synchronization is attained when the cross-correlation results of a predetermined number X of the received branches exceed a threshold value.

However, in the case of a receiving branch which does not exceed the threshold, a peak detection window within ±y[samples] from the synchronous timing of the branch that exceeds the threshold is formed and a cross-correlation value which is the peak value or the maximum value may be determined as synchronous timing.

Figure 13:
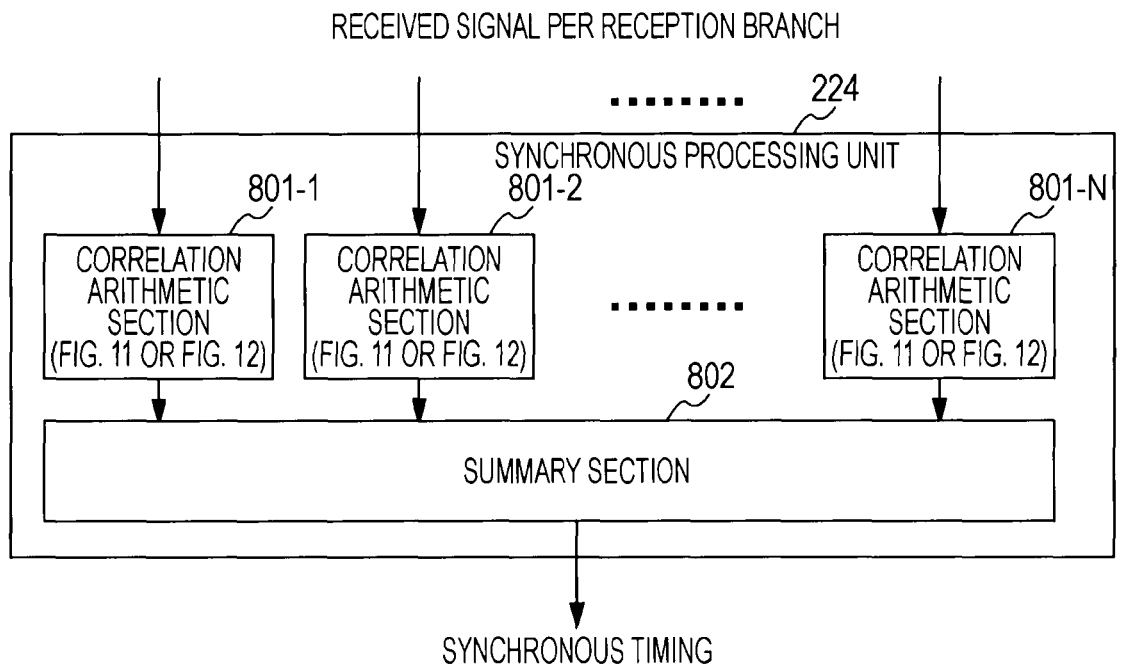
FIG. 13 is a schematic block diagram illustrating an exemplary internal configuration of synchronous processing unit 224.

The MIMO receiver shown in FIG. 3 is designed so that the synchronous processing unit 224 may detect synchronous timing from received signals from the respective reception branch after AD conversion. In this embodiment, as shown in FIG. 13, the synchronous processing unit 224 includes correlation arithmetic sections 801 shown in FIG. 11 or FIG. 12 which are arranged in parallel for the respective branches. A summary section 802 determines whether packet synchronization is attained on the basis of the outputs from the respective correlation arithmetic sections 801 (on the basis of the number of reception branches where the correlation results exceed the threshold).

Figure 14:
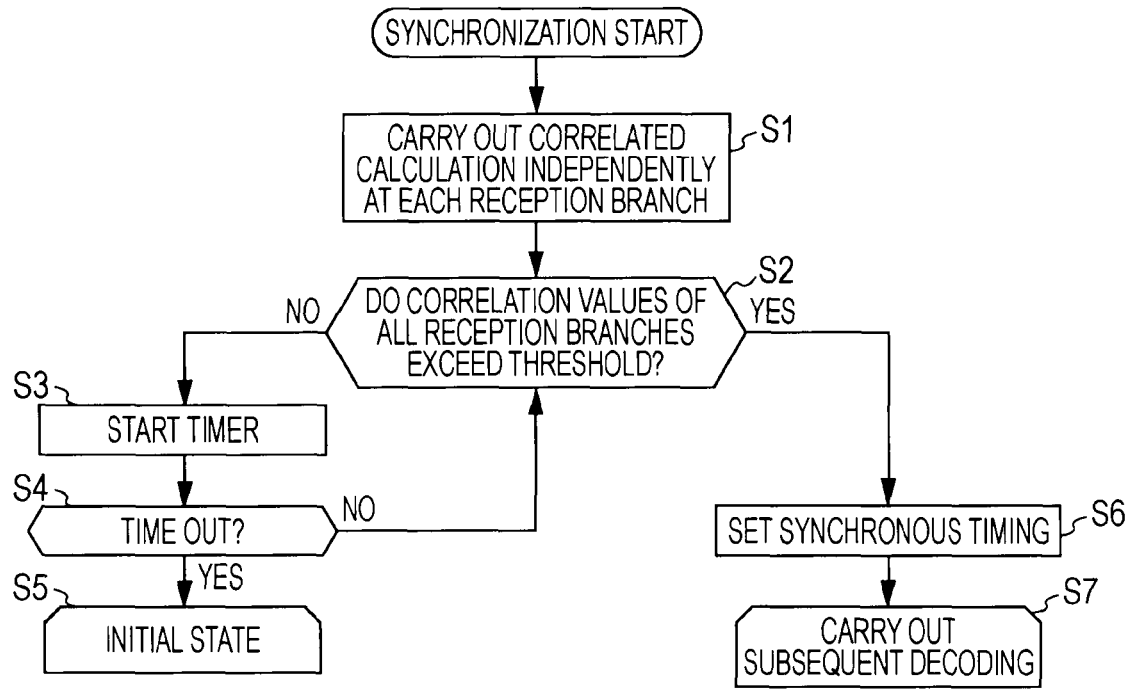
FIG. 14 is a flowchart illustrating an example of processing procedures for detecting synchronous timing based on the results of correlation processing for the respective reception branches.

FIG. 14 illustrates a flowchart that represents an example of processing procedures for detecting synchronous timing based on the results of correlation processing for the respective reception branches in the synchronous processing unit 224 shown in FIG. 13. In the synchronous processing unit 224, each of correlation arithmetic sections 801 provided for the respective reception branches carries out the correlation processing using a known training sequence of a time waveform at a preamble interval, independently from one another (Step S1).

Subsequently, the summary section 802 determines whether all correlation values obtained by the "N" reception branches have respectively exceeded the threshold (Step S2).

If all the correlation values obtained by "N" reception branches have not exceeded the threshold ("NO" in Step S2), a timer is started (Step S3). Until the timer is timed out ("NO" in Step S4), the process returns to step S2 and the summary section 802 continues totalizing the correlation values from the respective reception branches.

If all the correlation values obtained by "N" reception branches have exceed the threshold ("YES" in Step S2, then the summary section 802 sets synchronous timing (Step S6). After the synchronization acquisition, the receiver carries out subsequent processing such as data decoding (Step S7).

On the other hand, if all the correlation values acquired by "N" reception branches have not exceeded the threshold respectively ("NO" in Step S2) and the timer is timed out ("Yes" in Step S4), then the acquisition of synchronous timing is given up in the synchronous processing unit 224. As a result, the receiver concerned returns to an initial state (Step S6), and enters a standby state until the next packet is arrived.

In other words, according to the processing procedures shown in FIG. 14, the synchronous timing is established when all the correlation values calculated by the respective reception branches exceed the threshold.

FIG. 15 illustrates a flowchart that represents another example of processing procedures for detecting synchronous timing based on the results of correlation processing for the respective reception branches in the synchronous processing unit 224 shown in FIG. 13.

In the synchronous processing unit 224, each of correlation arithmetic sections 801 provided for the respective reception branches carries out the correlation processing using a known training sequence of a time waveform at a preamble interval, independently from one another (Step S11).

Subsequently, the summary section 802 determines whether the correlation values obtained by "X" or more reception branches among "N" reception branches have exceeded the threshold (Step S12).

Here, if the correlation values obtained by "X" or more reception branches among "N" reception branches have exceeded the threshold ("NO" in Step S12), the timer is started (Step S13). Until the timer is timed out ("NO" in Step S14), the process returns to step S2 and the summary section 802 continues totalizing the correlation values from the respective reception branches.

If all the correlation values obtained by "X" or more reception branches have exceed the threshold ("YES" in Step S12, then the summary section 802 sets synchronous timing (Step S16). After the synchronization acquisition, the receiver carries out subsequent processing such as data decoding (Step S17).

On the other hand, if the number of reception branches where the obtained correlation values thereof exceed the threshold does not reach "X" ("NO" in Step S12) and the timer is timed out ("YES" in Step S14), then the acquisition of synchronous timing is given up in the synchronous processing unit 224. As a result, the receiver concerned returns to an initial state (Step S16), and enters a standby state until the next packet is arrived.

In other words, according to the processing procedures shown in FIG. 15, the synchronous timing is established when the correlation values calculated by some of the reception branches exceed the threshold. In the case of a reception branch that does not exceed the threshold, a cross-correlation value which is the peak value or the maximum value may be determined as synchronous timing. Alternatively, as described above, a peak detection window within ±y[samples] from the synchronous timing of the branch that exceeds the threshold is formed and a cross-correlation value which is the peak value or the maximum value may be determined as synchronous timing. Furthermore, how to determine synchronous timing of the reception branch which has not exceeded the threshold is shown in FIG. 16.

In the above description, the detection of synchronous timing is performed based on correlation processing, or either of autocorrelation processing (see FIG. 11) or cross-correlation processing (see FIG. 12), for each of the reception branches in the synchronous processing unit 224. Alternatively, the detection of synchronous timing may be performed using a combination of these kinds of processing such that the detection of coarse synchronous timing is performed by the autocorrelation processing (finding a packet) and the detection of detailed synchronous timing is then performed by the cross-correlation processing. Here, the finding of the packet initiates the latter cross-correlation processing.

Figure 17:
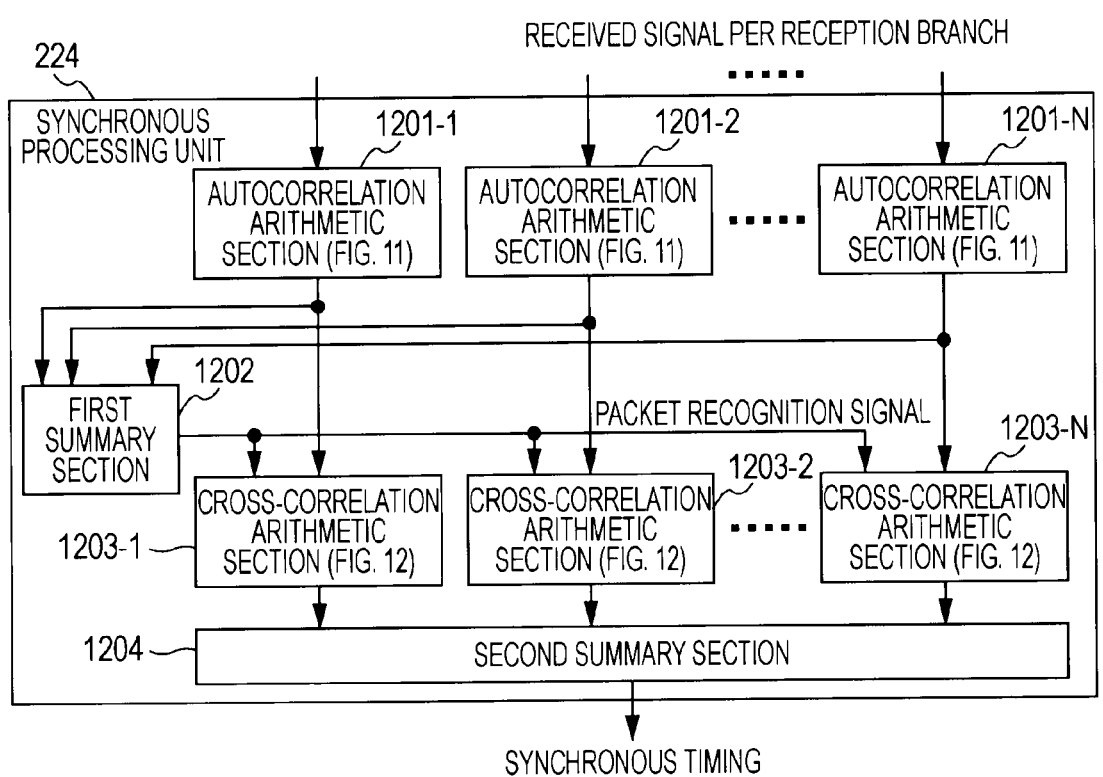
FIG. 17 is a schematic block diagram illustrating an exemplary internal configuration of synchronous processing unit 224, where the finding of a packet by autocorrelation processing and the detection of detailed synchronous timing by subsequent cross-correlation processing are used in combination.

FIG. 17 illustrates an exemplary internal configuration of synchronous processing unit 224 in which the finding of a packet by autocorrelation processing and the detection of detailed synchronous timing by subsequent cross-correlation processing are used in combination.

The synchronous processing unit 224 includes autocorrelation arithmetic sections 1201 for the respective reception branches and cross-correlation arithmetic sections 1203 for the respective reception branches. The autocorrelation arithmetic sections 1201 performs autocorrelation processing using a known training sequence STS of a time waveform at the L-STF interval. The cross-correlation arithmetic sections 1203 performs cross-correlation processing using a known training sequence LTS of a time waveform at the L-LTF interval.

A first summary section 1202 validates an identifying signal for the packet finding based on the summarized results of autocorrelation values of the respective reception branches. For example, it may validate the identifying signal for the packet finding when the autocorrelation results of a predetermined number X of the received branches exceed a threshold value.

In addition, the cross-correlation arithmetic section 1203 for each reception branch is initiated in response to the validated identifying signal and then carries out the cross-correlation processing using LTS of a time waveform of the L-LTF section.

Furthermore, a second summary section 1204 performs the detection of detailed timing based on the summarized results of cross-correlation values of the respective reception branches. For example, the synchronous processing unit 224 determines that the packet synchronization is attained when the cross-correlation results of a predetermined number X of the received branches exceed a threshold value. However, in the case of a receiving branch which does not exceed the threshold, a peak detection window within ±y[samples] from the synchronous timing of the branch that exceeds the threshold is formed. Then, a cross-correlation value which is the peak value or the maximum value is determined as synchronous timing.

Furthermore, just as in the case with the detection of synchronous timing, the AGC control may be independently performed on each reception branch to overcome a problem in that the minimum and maximum reception gains may have significant variations between the reception branches due to multipath fading. Comparing with a case where the AGC control is commonly performed in all the reception branches, an effect of suppressing the dynamic range of an AD converter is expectable.

Figure 18:
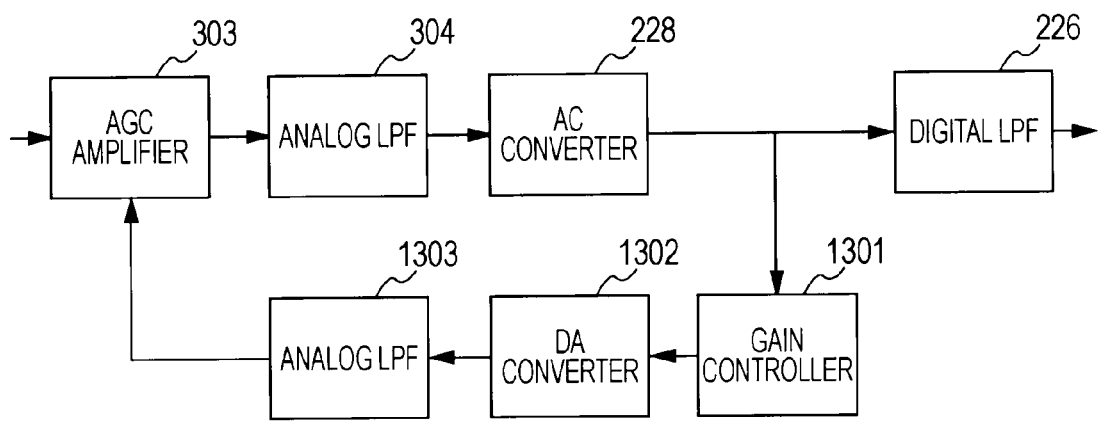
FIG. 18 is a schematic diagram illustrating an exemplary configuration of a control loop in which a digital domain controls an AGC amplifier 303.

FIG. 18 is an exemplary configuration of a control loop in which a digital domain controls an AGC amplifier 303. In this embodiment, the AGC control illustrated in the figure is performed in each of the reception branches.

A received signal is converted into a digital signal by AD converter (ADC) 228 and then subjected to gain control. A gain controller 1301 calculates an amplification degree in the AGC amplifier based on the amplitude of the received signal. Received power is calculated from the amplitude of the received signal. The digital signal is reconverted into an analog signal by a digital-analog converter (DAC) 1302. The analog signal is then passed through an analog low-pass filter (LPF) 1303. Subsequently, the signal is fed back to the AGC amplifier 303. However, if an AGC gain is fixed, then the gain controller 1301 suspends all the processes and holds output signal for the gain control which has been previously outputted.

When the AGC control is independently performed in each of the reception branches, an effect of suppressing the dynamic range of an AD converter is expectable compared with a case where the AGC control is commonly performed in all the reception branches.

However, the subsequent decoding processing should hold the gain ratio of the branches. That is, the setting gain ratio between the reception branches when performing AGC is memorized in advance. A final estimated value is obtained in consideration of a fixed gain ratio between the reception branches when various estimated values for each reception branch are averaged or subjected to weighted averaging depending on likelihood.

For example, consideration of a gain between branches is indispensable for the calculation of:
 (1) channel-matrix information and its inverse-matrix information; and
 (2) averaging processing of noise level, SNR, and likelihood information.

As mentioned above, it has explained in detail about the present invention, referring to a specific embodiment. However, it is obvious that a person skilled in the art can accomplish correction and substitution of this embodiment without departing from the gist of the present invention.

Although the embodiment adopted to IEEE 802.11n, an extended standard of IEEE 802.11 has been mainly described, the gist of the present invention is not limited thereto. The present invention is applicable similarly to various wireless communication systems which adopt the MIMO communication system.

Examples of the wireless-communication systems include Mobile WiMax (worldwide interoperability for microwave) based on IEEE 802.16e, IEEE 802.20 which is a mobile-oriented high-speed-wireless-communications standard, high-speed wireless PAN (personal area network) standard which uses a 60 GHz (millimeter wave) band, wireless HD which enables transmission of incompressible HD (High Definition) image using wireless transmission of 60 GHz (millimeter wave) band, and fourth generation (4G) cellular phone.

In short, the present invention should not be indicated with the form of instantiation, and the entry content of this specification should not be interpreted restrictively. In order to determine the gist of the present invention, the claim should be taken into consideration.

The present application contains subject matter related to that disclosed in Japanese Priority Patent Application JP 2008-263960 filed in the Japan Patent Office on Oct. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus for receiving packets transmitted with delay amounts different for the respective transmission branches, comprising:
 a plurality of reception branches;
 a synchronous processing unit that detects synchronous timing independently for said respective reception branches; and
 a signal processing unit that performs decoding processing subsequent to said synchronous timing for said respective reception branches, wherein
 said synchronous processing unit detects said synchronous timing for said respective reception branches by auto-correlation processing of a repetitive portion of time waveform for a preamble period of a received packet,
 said synchronous processing unit determines that packet synchronization is attained under the conditions that autocorrelation results of more than X reception branches exceed a threshold value, and
 the peak value or the maximum value of said autocorrelation values is determined as synchronous timing with respect to a reception branch in which an autocorrelation result does not exceed the threshold (X is an integer of 1 or more but not more than the number of said reception branches).

2. The wireless communication apparatus according to claim 1, further comprising:
 a gain controller independently performing gain control of each of said reception branches.

3. A wireless communication apparatus for receiving packets transmitted with delay amounts different for the respective transmission branches, comprising:
 a plurality of reception branches;
 a synchronous processing unit that detects synchronous timing independently for said respective reception branches; and
 a signal processing unit that performs decoding processing subsequent to said synchronous timing for said respective reception branches, wherein
 said synchronous processing unit detects said synchronous timing for said respective reception branches by auto-correlation processing of a repetitive portion of time waveform for a preamble period of a received packet,
 said synchronous processing unit determines that packet synchronization is attained under the conditions that autocorrelation results of more than X reception branches exceed a threshold value, and
 with respect to a reception branch in which an autocorrelation result does not exceed the threshold, the peak value or the maximum value of the autocorrelation values is determined as synchronous timing within a peak detection window being defined while focusing said synchronous timing obtained by said reception branches where autocorrelation results exceed the threshold (X is an integer of 1 or more but not more than the number of said reception branches).

4. A wireless communication apparatus for receiving packets transmitted with delay amounts different for the respective transmission branches, comprising:
 a plurality of reception branches;
 a synchronous processing unit that detects synchronous timing independently for said respective reception branches; and
 a signal processing unit that performs decoding processing subsequent to said synchronous timing for said respective reception branches, wherein
 said synchronous processing unit detects said synchronous timing for said respective reception branches by cross-correlation processing of a repetitive portion of time waveform for a preamble period of a received packet,
 said synchronous processing unit determines that packet synchronization is attained under the conditions that cross-correlation results of more than X reception branches exceed a threshold value, and the peak value or the maximum value of said cross-correlation values is determined as synchronous timing with respect to a reception branch in which a cross-correlation result does not exceed the threshold (X is an integer of 1 or more but not more than the number of said reception branches).

5. A wireless communication apparatus for receiving packets transmitted with delay amounts different for the respective transmission branches, comprising:
   a plurality of reception branches;
   a synchronous processing unit that detects synchronous timing independently for said respective reception branches; and
   a signal processing unit that performs decoding processing subsequent to said synchronous timing for said respective reception branches, wherein
   said synchronous processing unit detect said synchronous timing for said respective reception branches by cross-correlation processing of a repetitive portion of time waveform for a preamble period of a received packet,
   said synchronous processing unit determines that packet synchronization is attained under the conditions that cross-correlation results of more than X reception branches exceed a threshold value, and
   with respect to reception branches in which cross-correlation results do not exceed the threshold, the peak value or the maximum value of the autocorrelation values is determined as synchronous timing within a peak detection window being defined while focusing said synchronous timing obtained by said reception branches where cross-correlation results exceed the threshold (X is an integer of 1 or more but not more than the number of said reception branches).

6. A wireless communication apparatus for receiving packets transmitted with delay amounts different for the respective transmission branches, comprising:
   a plurality of reception branches;
   a synchronous processing unit that detects synchronous timing independently for said respective reception branches; and
   a signal processing unit that performs decoding processing subsequent to said synchronous timing for said respective reception branches, wherein
   said synchronous processing unit performs packet finding by autocorrelation processing of the repetitive portion of time waveform of a preamble period in a received packet and cross-correlation processing detects detailed synchronous timing after validating said packet finding, and
   said packet finding is validated under the conditions that the autocorrelation results of X or more reception branches exceed a predetermined threshold (X is an integer of 1 or more but not more than the number of said reception branches).

7. A wireless communication apparatus for receiving packets transmitted with delay amounts different for respective transmission branches, comprising:
   a plurality of reception branches;
   a synchronous processing unit that detects synchronous timing independently for said respective reception branches; and
   a signal processing unit that performs decoding processing subsequent to said synchronous timing for said respective reception branches, wherein
   said synchronous processing unit performs packet finding by autocorrelation processing of the repetitive portion of a time waveform of a preamble period in a received packet and cross-correlation processing detects detailed synchronous timing after validating said packet finding,
   said synchronous processing unit determines that packet synchronization is attained under the conditions that cross-correlation results of more than X reception branches exceed a threshold value, and
   with respect to reception branches in which cross-correlation results do not exceed the threshold, the peak value or the maximum value of the autocorrelation values is determined as synchronous timing within a peak detection window being defined while focusing said synchronous timing obtained by said reception branches where cross-correlation results exceed the threshold (X is an integer of 1 or more but not more than the number of said reception branches).

8. A method of wireless communications to receive receiving packets transmitted with different delay amounts for respective transmission branches in a wireless communication apparatus with a plurality of reception branches, the method comprising:
   performing synchronous processing where synchronous timing is independently detected for each of said reception branches; and
   performing signal processing where said synchronous timing independently detected for each of said reception branches is used in decoding processing subsequent to said synchronous processing, wherein
   said synchronous timing is detected for said respective reception branches by autocorrelation processing of a repetitive portion of time waveform for a preamble period of a received packet,
   said performing synchronous processing includes determining that packet synchronization is attained under the conditions that autocorrelation results of more than X reception branches exceed a threshold value, and
   the peak value or the maximum value of said autocorrelation values is determined as synchronous timing with respect to a reception branch in which an autocorrelation result does not exceed the threshold (X is an integer of 1 or more but not more than the number of said reception branches).

9. A computer program in computer readable format to execute on a computer processing for receiving packets transmitted with different delay amounts for respective transmission branches in a wireless communication apparatus with a plurality of reception branches, said computer program comprising:
   a program instruction for allowing said computer to be functioned as a synchronous processing unit which detects synchronous timing independently for said every reception branch; and
   a program instruction for allowing said computer to be functioned as a signal processing where said synchronous timing independently detected for each of said reception branches by synchronous processing unit is used in decoding processing subsequent to synchronous processing, wherein
   said synchronous timing is detected for said respective reception branches by autocorrelation processing of a repetitive portion of time waveform for a preamble period of a received packet,
   said computer functioned as a synchronous processing unit determines that packet synchronization is attained under the conditions that autocorrelation results of more than X reception branches exceed a threshold value, and
   the peak value or the maximum value of said autocorrelation values is determined as synchronous timing with respect to a reception branch in which an autocorrelation result does not exceed the threshold (X is an integer of 1 or more but not more than the number of said reception branches).

* * * * *